B. J. COREY & E. NEFF.
VEHICLE-SPRING.

No. 169,524. Patented Nov. 2, 1875.

WITNESSES
Henry N. Miller
C. L. Ewert

INVENTOR
B. J. Corey & Elijah Neff.
By Alexander Mason
Attorney

UNITED STATES PATENT OFFICE.

BARNEY J. COREY AND ELIJAH NEFF, OF ROCHESTER, INDIANA.

IMPROVEMENT IN VEHICLE-SPRINGS.

Specification forming part of Letters Patent No. 169,524, dated November 2, 1875; application filed September 14, 1875.

*To all whom it may concern:*

Be it known that we, BARNEY J. COREY and ELIJAH NEFF, of Rochester, in the county of Fulton and in the State of Indiana, have invented certain new and useful Improvements in Equalizers for Springs to Vehicles; and do hereby declare that the following is a full, clear, and exact description thereof, reference being had to the accompanying drawings and to the letters of reference marked thereon, making a part of this specification.

The nature of our invention consists in the arrangement, with the springs of a vehicle, of a device to prevent the separation of the upper and lower leaves of the spring sufficiently to endanger the breaking or straining of same, as will be hereinafter more particularly set forth.

Figure 1:
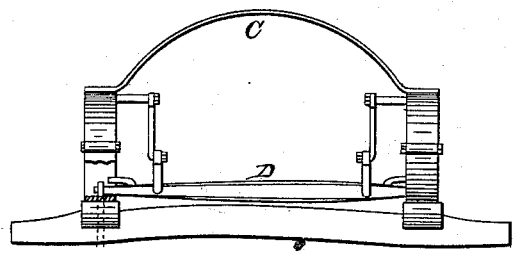
Figure 2:
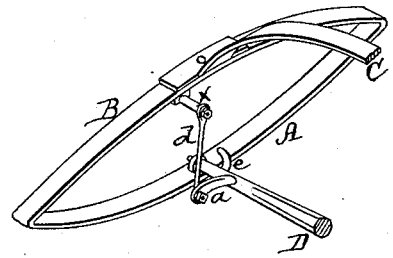

In the annexed drawings, making part of this specification, Figure 1 represents a front view with one spring cut in two, and Fig. 2 represents a perspective.

In the drawings, A represents the bottom leaf, and B the upper or top leaf, of an elliptic spring, which is secured to the axle of a vehicle in any of the well-known and usual ways. C represents a bow, which connects the two top leaves of two opposite springs together. D represents a metallic bar, which lies parallel with the axle and just above it. The ends of this bar have their bearings in suitable eyes or loops on the bottom leaves of the springs, at their centers. The bar D is provided, at or near each end, with two arms, $a$ and $e$, which extend out from it on different sides. The arm is so curved that its end will rest, when desirable, upon the lower leaves of the springs. The arm $a$ is connected, by means of a connecting-rod, $d$, to an arm, $x$, which is secured to the leaves of the upper portion of the springs.

By this arrangement, it will be seen that when the upper leaves of the springs separate a certain distance from the lower leaves, the rod $d$, connected to arm $x$, causes the shaft or bar D to partially revolve until the arm $e$ strikes the leaf A, thus preventing further separation, as, also, preventing the breaking or straining of the spring. As springs of vehicles almost invariably break by the upward strain of their leaves, it will be perceived that this device will prevent it.

Having thus fully described our invention, what we claim as new, and desire to secure by Letters Patent, is—

The bar D, with its arms $a$ and $e$, the connecting-rod $d$, and arm $x$, in combination with the upper and lower leaves of a spring for vehicles, as and for the purpose set forth.

In testimony that we claim the foregoing we have hereunto set our hands this 11th day of August, 1875.

BARNEY J. COREY.
ELIJAH NEFF.

Witnesses:
JACOB GERSON,
J. P. NELLAN.